US006873287B2

United States Patent
Forsberg

(10) Patent No.: US 6,873,287 B2
(45) Date of Patent: Mar. 29, 2005

(54) SIGNAL PROCESSING ARRANGEMENT

(75) Inventor: Häkan Forsberg, Västra Frölunda (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/985,086

(22) Filed: Nov. 1, 2001

(65) Prior Publication Data

US 2002/0158792 A1 Oct. 31, 2002

(30) Foreign Application Priority Data

Nov. 2, 2000 (SE) .............................................. 0004015

(51) Int. Cl.$^7$ .............................................. G01S 13/00
(52) U.S. Cl. .................. 342/195; 342/25 R; 342/25 A; 342/26 R; 342/26 A; 342/26 B; 342/26 D; 342/59; 342/89; 342/91; 342/93; 342/159; 342/162; 342/175; 712/10; 712/11; 712/12
(58) Field of Search ............................. 342/25 R–26 D, 342/27, 58, 52–54, 59, 159–164, 202–204, 89, 90, 91, 92, 93, 175, 192–197, 140; 712/10, 11, 12, 13, 14, 15, 16, 17, 18, 19, 20, 21, 22

(56) References Cited

U.S. PATENT DOCUMENTS

| | | | | |
|---|---|---|---|---|
| 4,933,836 A | * | 6/1990 | Tulpule et al. ................. | 712/12 |
| 5,590,367 A | | 12/1996 | Lin et al. | |
| 5,748,143 A | * | 5/1998 | Melvin et al. ............... | 342/196 |
| 5,907,302 A | * | 5/1999 | Melvin, Jr. ................. | 342/140 |
| 6,016,211 A | | 1/2000 | Szymanski et al. | |
| 6,167,502 A | * | 12/2000 | Pechanek et al. .............. | 712/12 |
| 6,252,540 B1 | * | 6/2001 | Hale et al. ................... | 342/196 |
| 6,292,592 B1 | * | 9/2001 | Braunreiter et al. .......... | 342/90 |
| 6,400,306 B1 | * | 6/2002 | Nohara et al. ............... | 342/195 |
| 6,489,918 B2 | * | 12/2002 | Bickert et al. ............... | 342/162 |
| 6,549,160 B2 | * | 4/2003 | Meyer-Hilberg .......... | 342/25 R |

FOREIGN PATENT DOCUMENTS

| EP | 0 394 883 A2 | 10/1990 |
|---|---|---|
| EP | 0 674 192 A2 | 9/1995 |

OTHER PUBLICATIONS

A. Farina et al., "Space–Time Processing for AEW Radar"; Proceedings of the IPPS 1996, The 10th International Parallel Processing Symposium; IEEE Computer Society Press; Los Alamitos, California; 1996; pp. 312–315.*

A. Steinhardt et al., "Subband STAP Processing, The Fifth Generation", IEEE Publication 0–7803–6339–6/00/$10.00; copyrighted in the year 2000.*

(Continued)

Primary Examiner—Bernarr E. Gregory

(57) ABSTRACT

The present invention relates to a method and an arrangement suitable for embedded signal processing, comprising a number of computational units (100), each computational unit comprising a number of processing elements (20) capable of working independently and transmitting data simultaneously. Said computational units are arranged in clusters, work independently, and transmit data simultaneously, and that said processing elements (20) are globally and regularly inter-connected optically in a hypercube topology and transformed into a planar waveguide.

26 Claims, 11 Drawing Sheets

OTHER PUBLICATIONS

H. Forsberg et al., "Radar Signal Processing Using Pipelined Optical Hypercube Interconnects"; IEEE Publication 0-7695-0990-8/01/$10.00; copyrighted in the year 2001.*

Jonsson, Magnus, "High Performance Fiber-Optic Interconnection Networks for Real-Time Computing Systems", Chalmers Reproservice, Göteberg, Sweden Nov. 1999, pp. 1-173.

Cain, Kenneth et al., "RT_STAP: Real-Time Space-Time Adaptive Processing Benchmark", The MITRE Corporation, Center for Air Force C3 Systems, Bedford, Massachusetts, Feb. 1997, pp. 3-71.

Johnsson, S: Lennart et al., "Optimum Broadcasting and Personalized Communication in Hypercubes", IEEE Transactions on Computers, vol. 38, No. 9, Sep. 1989, pp. 1249-1268.

Teitelbaum, Kenneth, "Crossbar Tree Networks for Embedded Signal Processing Applications", Defense Advanced Research Projects Agency, pp. 1-8.

Ozaktas, Haldun, "Towards an Optimal Foundation Architecture for Optoelectronic Computing", IEEE, Proceedings of MPPOI, 1996, pp. 8-15.

Foster, Ian, "Designing and Building Parallel Programs: Concepts and Tools for Parallel Software Engineering", ISBN: 0-201-67694-9, pp. 337-348.

Jahns, Jürgens, "Integrated Free-Space Optical Interconnects for Chip-to-Chip Communications", (4 pgs.).

Jahns, Jürgens. "Planar Packaging of Free-Space Optical Interconnections". Proceedings of the IEEE, vol. 82, No. 11. Nov. 1994.

Jahns, J., "Integrated Free-Space Optical Interconnects for Chip-to-Chip Communications", 2 pages, no date.

Louri, A. et al., An Optical Multi-Mesh Hypercube: "A Scalable Optical Interconnection Network for Massively Parallel Computing", Journal of Lightwave Technology, vol. 12, No. 4, Apr. 1994, pp. 704-716.

Ozaktas, H., "Fundamentals of Optical Interconnections-a Review", IEEE, 1997, pp. 184-189.

Westin, E., International-Type Search Report performed by Swedish Patent Office as completed on Sep. 3, 2001 for SE 00/01295, 3 pages.

* cited by examiner

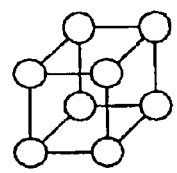
FIG. 1a
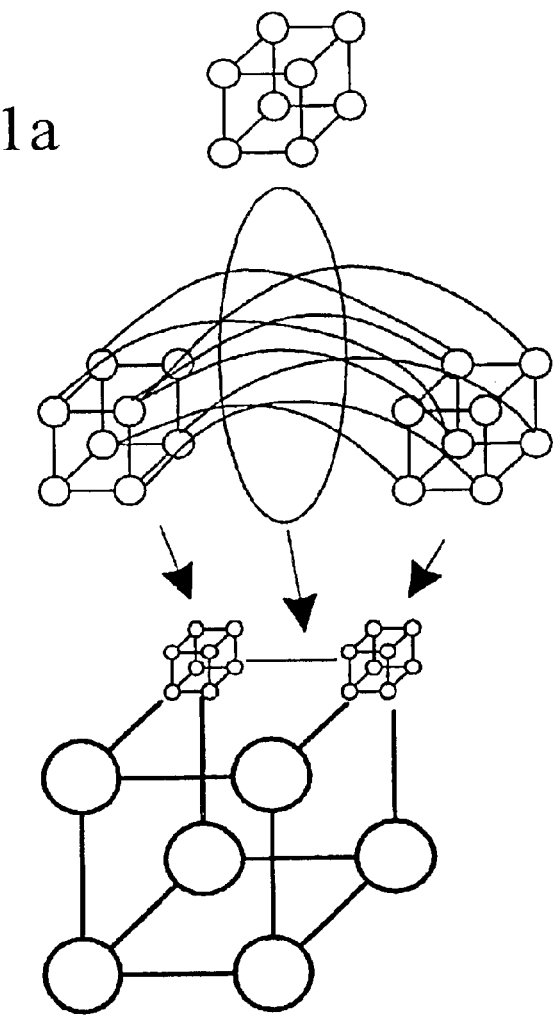
FIG. 1b
FIG. 1c
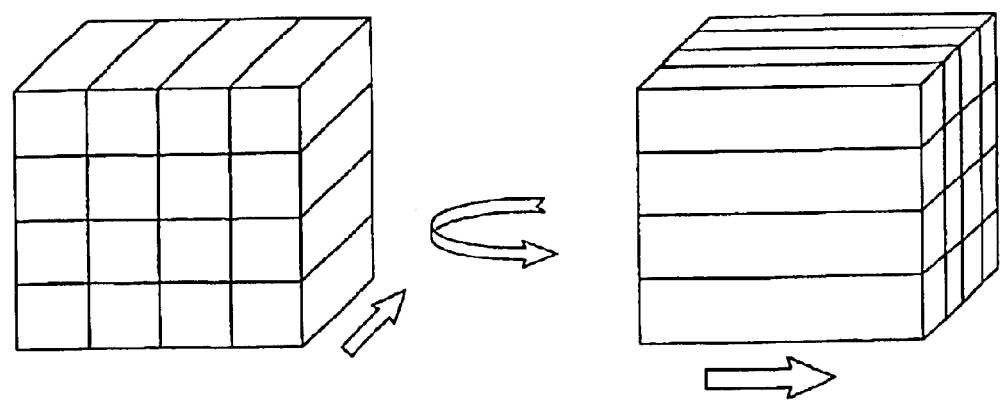
FIG. 2

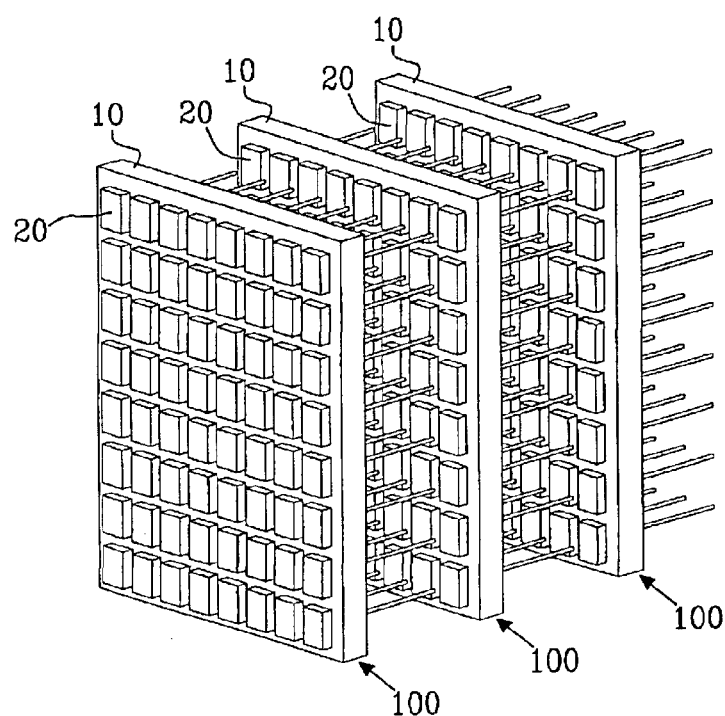
FIG.9
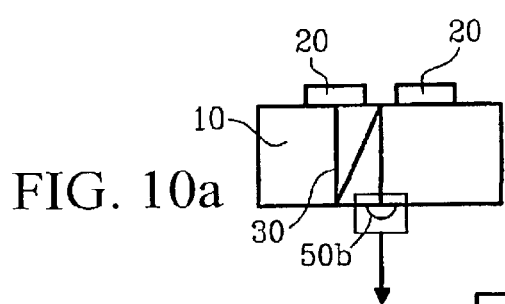
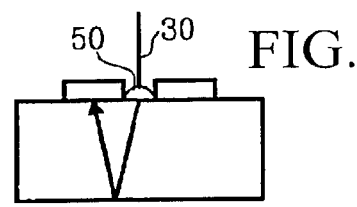
FIG. 10b
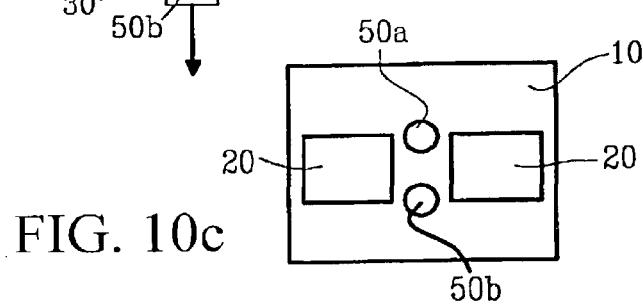

FIG. 11b
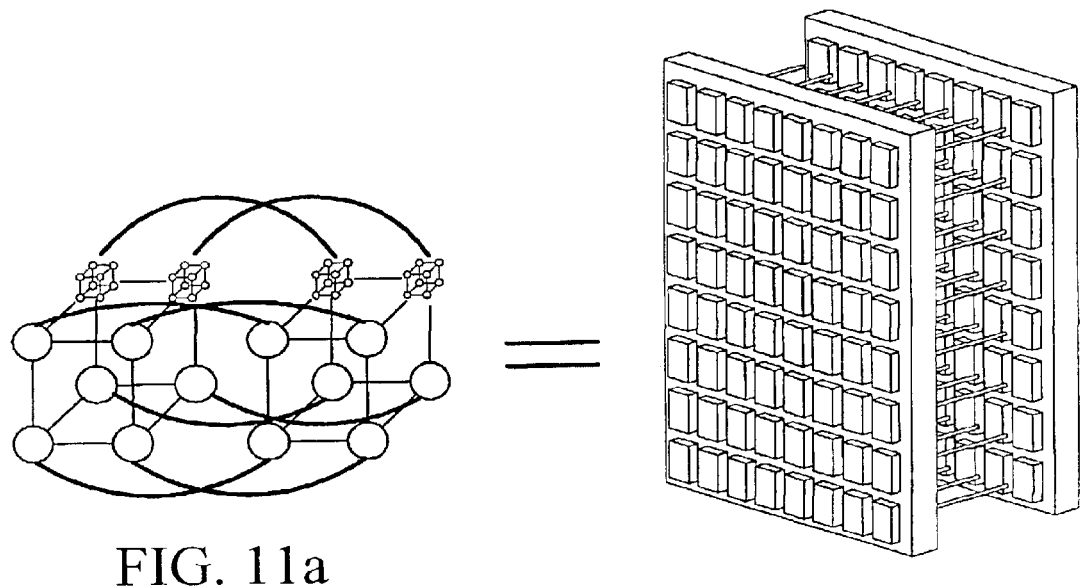
FIG. 11a
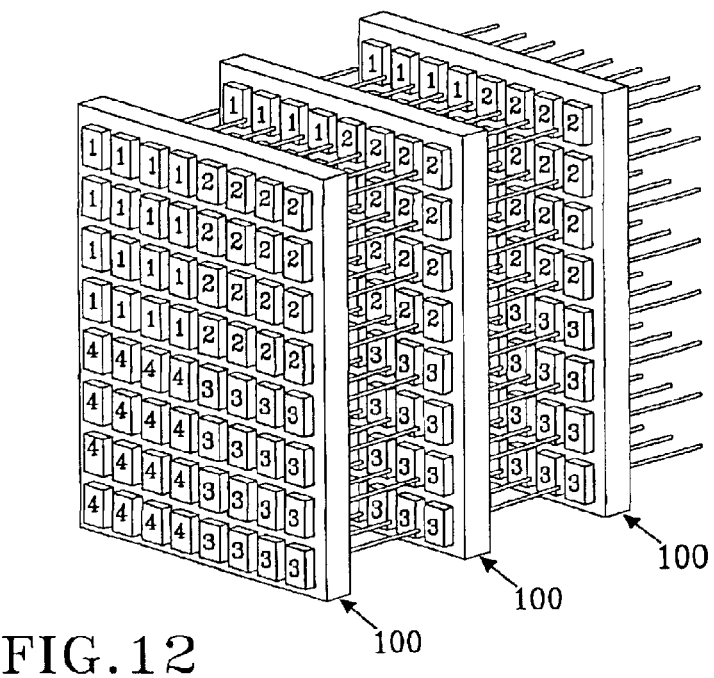
FIG. 12

SIGNAL PROCESSING ARRANGEMENT

TECHNICAL FIELD OF THE INVENTION

The invention relates to a method and an arrangement suitable for embedded signal processing, in which several computational units, capable of working independently and transmitting data simultaneously, are arranged in a hypercube topology forming an interconnection network within said arrangement.

BACKGROUND OF THE INVENTION

Algorithms recently proposed for applications in Embedded Signal Processing (ESP) systems, e.g. in radar and sonar systems, demand sustained performance in the range of 1 GFLOPS to 50 TFLOPS. As a consequence, many processing elements PEs) must work together, and thus the interconnect bandwidth will increase. Other requirements that typically must be fulfilled in ESP-systems are real-time processing, small physical size, and multimode operation. To be able to handle all these constraints at the same time, new parallel computer architectures are required.

Several such parallel and distributed computer systems for embedded real-time applications have been proposed, including those systems, which use fiber-optics in the interconnection network to achieve high bandwidth. See, for instance, M. Jonsson, *High Performance Fiber-Optic Interconnection Networks for Real-Time Computing Systems*, Doctoral Thesis, Department of Computer Engineering, Chalmers University of Technology, Goteborg, Sweden, November 1999, ISBN 91-7197-852-6.

Actually, by introducing optical technologies in ESP-systems, many uncompromising requirements can be met, The physical size, for example, can be reduced and the bandwidth over the cross section that divides a network into two halves, usually referred to as bisection bandwidth, can be improved, se for example K. Teitelbaum, "Crossbar tree networks for embedded signal processing applications", *Proceedings of Massively Parallel Processing using Optical Interconnections*, MPPOI'98, Las Vegas, Nev., USA, Jun. 15–17, 1998, pp. 200–207. This document also discloses that high Bisection Bandwidth (BB) reduces the time it takes to redistribute data between computational units that process information in different dimensions, and this property is of high importance in ESP-systems.

However, to make the best use of optics in inter-processing computing systems, all optical and opto-electronic properties must be taken into consideration. These properties include transmission in all spatial dimensions, light coherence, and high fan-out etc.

In fact, it has been shown that optical free-space inter-connected 3D-systems (systems using all three spatial dimensions for communication), with globally and regularly interconnected nodes, arrayed on planes, are best suited for parallel computer architectures using optics, see for example H. M. Ozaktas, "Towards an optimal foundation architecture for optoelectronic computing", *Proceedings of Massively Parallel Processing using Optical Interconnections*, MPPOI'96, Maui, Hi., USA, Oct. 27–29, 1996, pp. 8–15. Folding optically connected 3D-systems into planes will also offer precise alignment, mechanical robustness, and temperature stability at a relatively low cost J. Jahns, "Planar packaging of free-space optical interconnections", *Proceedings of the IEEE*, vol. 82, no. 11, November 1994, pp. 1623–1631.

The hypercube is a topology that has been investigated extensively. One reason for its popularity is that many other well-known topologies like lower-dimensional meshes, butterflies, and shuffle-exchange networks can be embedded into the hypercube structure. Another reason is that this topology can be used to implement several algorithms requiring all-to-all communication, e.g. matrix transposition, vector reduction, and sorting, for example as described in 1. Foster, Designing and Building Parallel Programs: Concepts and Tools for Parallel Software Engineering, Addison Wesley Publishing Company, Inc., Reading, Mass., USA, 1995.

Geometrically, a hypercube can be defined recursively as follows: The zero-dimensional hypercube is a single processor. An n-dimensional hypercube with $N=2^n$ Processing Elements (PEs) is built of two hypercubes with $2^{n-1}$ PEs, where all PEs in one half are connected to the corresponding PEs in the other half. In FIG. 1, a 6-dimensional hypercube is shown. This hypercube is built of two 5D-hypercubes, which in turn are built of 4D-hypercubes, FIG. 1b. The 4D-hypercube is further subdivided into 3D-hypercubes, FIG. 1c. The thick lines in FIG. 1c correspond to eight interconnections each.

A disadvantage of the hypercube is its complexity. It requires more and longer wires than a mesh, since not only the nearest neighbors but also the distanced neighbors are connected to each other, if the dimension is greater than three, i.e. more dimensions than physical space. The fact is that the required amount of electrical wires (of different length) in a relatively small hypercube will be enormous. Consider, for instance, an implementation of a 6D-hypercube on a circuit board, where the transfer rate of a unidirectional link between two processing elements must be in the order of 10 Gbit/s. This implementation requires 12,288 electrical wires, of different length, each clocked with a frequency of 312.5 MHz (32-bit wide links assumed). Since the wires are not allowed to cross each other physically, numerous layers are required.

Above, it was stated that interconnection networks in for example ESP-systems must be able to efficiently redistribute data between computational units that process information in different dimensions. In FIG. 2, this reorganization process is shown. Here, the first cluster of processing elements, left cube, computes data in one dimension (marked with an arrow). Next working unit, right cube, computes data in another dimension, and thus redistribution must be performed.

This redistribution of data, referred to as corner turning, accounts for almost all of the-inter-processor communication in ESP-systems. Note also that corner turning requires all-to-all communication.

In hypercubes, a corner turn is actually, from a mathematical point of view, a matrix transposition. Therefore, as stated above, algorithms exist for this interconnection topology. Also, since the BB scales linearly with the number of processors in hypercubes, higher dimensions lead to very high BB.

A full corner turn takes:

$$\frac{\frac{1}{2} D_{size} \log_2(P)}{PR_{link,eff}} \qquad (1)$$

seconds. $D_{size}$ is the total size of the chunk of data to be redistributed, P is the number of processors in the hypercube, and $R_{link,eff}$ is the efficient transfer rate of a single link in one direction when overhead is excluded, e.g. message startup time. The equation above is based on the hypercube transpose algorithm described in I. Foster, *Designing and Building Parallel Programs: Concepts and Tools for Parallel Software Engineering*, Addison Wesley Publishing Company, Inc., Reading, Mass., USA, 1995. In this algorithm, data is only exchanged in one dimension at a time. Using this one-dimension-at-a-time procedure is a direct result of the cost saving "single-port" behavior. This is an extra feature compared to single-port communication where a node only can send and receive on one of its ports at the same time. In addition, each node is also capable of receiving different data from different neighbors at the same time, i.e. similar to a multi-port behavior. However, the algorithm chosen here is the same as the SBT-routing scheme described by S. L. Johnsson and C-T. Ho, "Optimum broadcasting and personalized communication in hypercubes", *IEEE Transactions on Computers*, vol. 38, no 9. September 1989, pp. 1249–1268. SBT-routing is within a factor of two of the lower bound of one-port all-to-all personalized communication.

In broadcasting, the data transfer time for one-port communication is minimized if one dimension is routed per time, i.e. the same principle as above, and all nodes use the same scheduling discipline. Using this principle, each node copy its own amount of data M to its first neighbor (along the first dimension), and simultaneously receives M amount of data from the same neighbor. Next time, each node copy its own data and the data just received from the first neighbor, to the second neighbor (along the second dimension), and simultaneously receives 2M amount of data. This procedure is repeated over all dimensions in the hypercube. Thus each node has to send and receive:

$$\sum_{l=0}^{\log_2(P)-1} 2^l M = (P-1)M \quad (2)$$

amount of data. M is the data size in each node that has to be copied to all other nodes in the hypercube, and P is the number of processors (nodes). Since each node has an efficient transfer rate of $R_{link,eff}$, broadcasting will take:

$$\frac{(P-1)M}{R_{link,eff}} \quad (3)$$

seconds. However, this equation is only valid if the nodes are considered as single-port. In reality, as described above, one copy of data from one node can actually be distributed to all $\log_2(P)$ neighbors at the same time, and each node can actually receive data from all its neighbors at the same time. The equation above should therefore not be considered as the optimal for this architecture, but good enough for its purpose.

SUMMARY OF THE INVENTION

The main object of the invention is to provide a method and arrangement, which solve the problems related with the known techniques using optical interconnection between a number of processing elements. Moreover, it is another object of the invention to use optical properties such as transmission in all spatial dimensions, light coherence, high bandwidth, and fan-out etc.

Therefore, the initially mentioned computational units are arranged in clusters and work independently and transmit data simultaneously, and that said processing elements are globally and regularly inter-connected optically in a hypercube topology and transformed into a planar waveguide. Preferably, said optical connection is a free-space connection.

The computational unit comprises of at least one transparent substrate having a first and a second surface, at least one of said surfaces being arranged with said processing elements. The processing elements are interconnected to each other and to processing elements of at least one neighboring computational unit through optical connection. In one embodiment at least one of said surfaces is reflective and that said optical interconnection in each substrate is achieved through reflection on said reflective surface. The optical interconnection in each substrate can also be achieved through beam splitting arrangements, which provides a high fan-out.

Each substrate is provided with optical elements for said optical interconnection between the substrates. For high throughput the arrangement comprises means for channel time-sharing for transmission of different data sent to all neighbors at the same time.

Preferably, the computational units are identical which allows the to be stacked. However, the computational units can be arranged side-by-side inter-connected via optical fibers.

Also, the computational units can be arranged in a hypercube topology forming an interconnection network within said arrangement.

The processing elements can be arranged according to planar packing technology.

The invention also relates to a method of providing an arrangement for embedded signal processing, comprising a number of computational units, each computational unit comprising a number of processing elements capable of working independently and transmitting data simultaneously. The method comprises the steps of arranging said computational units in clusters for operating independently and transmitting data simultaneously, optically inter-connecting said processing elements globally and regularly in a hypercube topology and transforming said hypercube into a planar waveguide.

Furthermore, the invention concerns an airborne radar system comprising a data processing unit for Space Time Adaptive Processing (STAP), data processing unit comprising a number of computational units, each computational unit comprising a number of processing elements, capable of working independently and transmitting data simultaneously. The computational units are arranged in clusters and work independently and transmit data simultaneously, and that said processing elements are globally and regularly inter-connected optically in a hypercube topology and transformed into a planar waveguide. The processing unit is arranged to function as video-to-I/Q conversion unit, array calibration unit, pulse compression unit, Doppler processing stage, weights computation unit and weights application unit arranged as pipeline stages. The video-to-I/Q conversion unit, array calibration unit, pulse compression unit and Doppler processing stage are arranged as a six-dimensional hypercube. The weights computation unit and weights application unit are arranged as a number of five-dimensional hypercubes.

The invention also relates to a ground based radar system comprising a data processing unit comprising a number of computational units, each computational unit comprising a number of processing elements capable of working independently and transmitting data simultaneously. The computational units are arranged in clusters, work independently, and transmit data simultaneously, and that said processing elements are globally and regularly inter-connected optically in a hypercube topology and transformed into a planar waveguide.

The processing unit is arranged to function as a digital beamforming unit, pulse compression unit, Doppler processing stage, envelope detection unit, Constant False Alarm Ratio unit (CFAR) and an extractor unit. The digital beamforming unit, pulse compression unit, Doppler processing stage, envelope detection unit are arranged as two seven-dimensional hypercubes. The Constant False Alarm Ratio unit and an extractor unit are arranged as a number of five-dimensional hypercubes.

According to a method of processing data in above mentioned airborne radar system, the performed steps are:

Pre-processing, Doppler processing, and performing two corner turns on the same six-dimensional hypercube, If the datacube is numbered odd, folding it and distributing data to an upper cluster of eight five-dimensional hypercubes, If the datacube is numbered even, folding it and distribute data to other cluster of five-dimensional hypercubes, Performing weights computation and application on the same working cluster of eight five-dimensional hypercubes and during a time period.

According to a method of processing data in above mentioned ground based radar system, the steps performed are:

performing digital beamforming, pulse compression, Doppler processing, envelope detection, and two corner turns on said seven-dimensional hypercube during the first coherent pulse interval, Folding the datacube twice, from seven-dimensional to five-dimensional, Preparing to divide data among a pulse or range dimension depending on the shape of the datacube in the previous stage, and distribute fractions to an upper cluster of four five-dimensional hypercubes, if the datacube is numbered odd If the datacube is numbered even, distributing data to another cluster of five-dimensional hypercubes, and Computing the CFAR and the extraction stage on the same cluster during the remaining time.

BRIEF DESCRIPTION OF THE DRAWINGS

In the following, the invention will be described in more detail with reference to the attached drawings, in which:

FIG. 1a is the theoretical structure of a 3D-hypercube;

FIG. 1b is the theoretical structure of a 4D-hypercube built of two 3D-hypercubes;

FIG. 1c is the theoretical structure of a 6D-hypercube built of two 5D-hypercubes, which in turn are built of 4D-hypercubes;

FIG. 2 shows the redistribution of data between processing elements, computing in different dimensions in a hypercube;

FIG. 9 is an example of a hardware architecture, a pipelined system of optical planar-packaged hypercubes comprising of three 6D -hypercubes transformed into planes and massively interconnected, FIG. 10a shows a schematically in one embodiment lenses (or holes) for connecting different computational units, showing bottom lens, used for transmitter light to flow out to next unit;

FIG. 10b shows schematically in one embodiment lenses (or holes) for connecting different computational units, showing top lens, used for collimating lights into the substrate from previous unit;

FIG. 10c shows schematically in one embodiment lenses (or holes) for connecting different computational units from a top view;

FIG. 11a is an illustration of topological view over a 7D-hypercube;

FIG. 11b is an illustration of physical view over a 7D-hypercube;

FIG. 12 shows four independently working chains of 4D-hypercubes, wherein each chain is marked with its own numbers from 1–4.

DETAILED DESCRIPTION OF THE EMBODIMENTS

In the following other advantageous and benefits of the invention will be more clear in conjunction with description of some preferred embodiments.

The architecture of a computing arrangement according to the invention consists of several computational modules that work independently and send data simultaneously in order to achieve high throughput. Each computational module is composed of multiple processors connected in a hypercube topology to meet scalability and high bisection bandwidth requirements. Free-space optical interconnection and planar packaging technology make it possible to transform the hypercubes into planes. Optical fan-out reduces the number of optical transmitters and thus the hardware cost.

Generally, it seems that the hypercube is an exceptionally good topology for systems such as ESP or the like. The only disadvantage is its interconnection complexity. However, by using optical properties in free-space optically interconnected 3D-systems are folded into planes, and the interconnect complexity can be greatly reduced.

There are several reasons to fold optically connected 3D-systems into planes, including those already mentioned in the above. One reason is the ability to cool, test, and repair the circuits in a simple way.

In optical planar technology, waveguides are made of glass or transparent semiconductor based substrates. These substrates serve as a light traveling medium as well as a carrier for surface mounted optical electronic and electronic chips. Also micro-optical elements, such as beam-splitters and microlenses, can be attached on both the top and bottom sides of the substrate. To be able to enclose the optical beams in the light traveling medium, the surfaces are covered with a refractive structure. The beams will, hence, "bounce" on the surface.

In the following six steps, 1–6, and FIGS., 3–8, merger of a 6D-hypercube topology into a planar waveguide is described. Since a 6D-hypercube is merged into a plane, it is natural to imagine that three of the topology dimensions are transformed into one physical direction on the substrate, here called horizontal direction. The other three topological dimensions are thus transformed into the other physical direction, here called vertical. Further, since the hypercube is symmetric, everything that is valid in one direction is automatically valid in the other direction. Throughout the description, the reference sign 10 will be adhered to the substrate, 20 to a PE, 30 to a light beam, 40 to a beamsplitter, 50 a lens and 100 to a computational unit comprising of a substrate and PEs.

Step 1: Transmitters in horizontal direction.

Figure 3A:
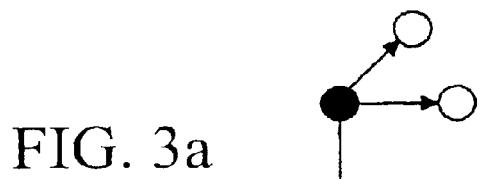
FIG. 3a shows schematically the topological cross-section view of four processing entities arranged according to the invention, in a first mode.
Figure 3B:
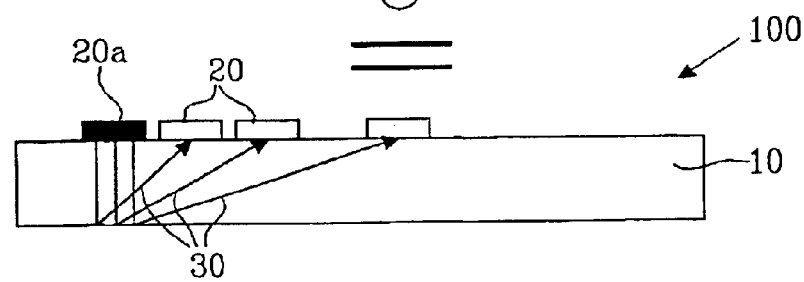
FIG. 3b shows schematically the physical cross-section view of four processing entities arranged according to the invention, in a first mode.
Figure 6:
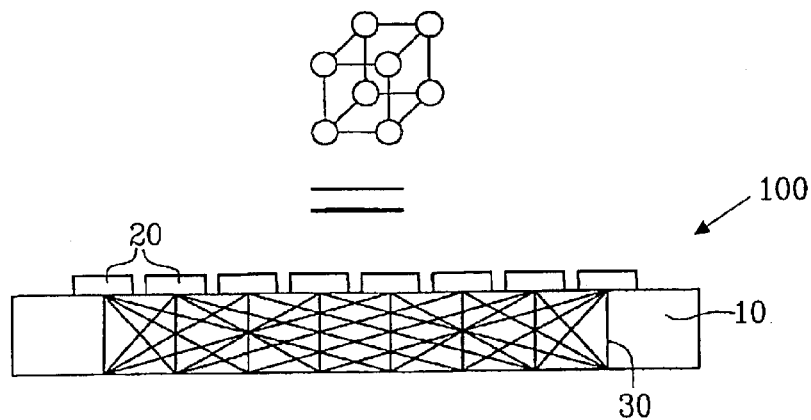
FIG. 6 is one embodiment in which all transmitters and receivers are arranged in a horizontal row forming a 3D-hypercube.

In a 6D-hypercube, FIGS. 3a and 6b, each processing element 20 has six neighbors. Physically, this corresponds to three horizontal and three vertical neighbors. In FIG. 3, both the topological (3a) and physical (3b) structure of the hypercube is shown. The PE 20a, dark colored, sends data to its three horizontal neighbors 20.

Step 2: Receivers in horizontal direction.

Figure 4A:
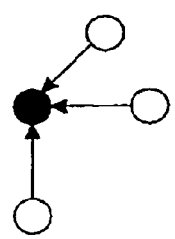
FIG. 4a shows schematically the topological cross-section view of four processing entities arranged according to the invention, in a second mode.
Figure 4B:
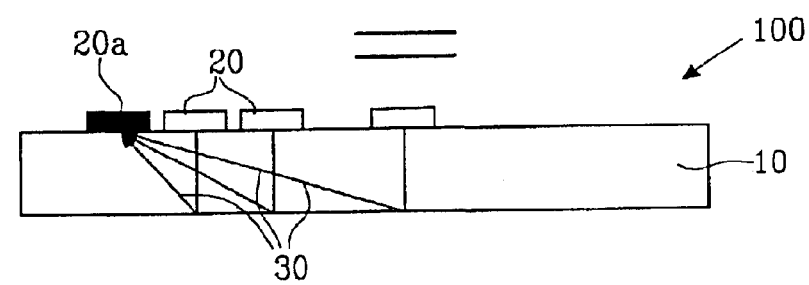
FIG. 4b shows schematically the physical cross-section view of four processing entities arranged according to the invention, in a second mode.

In the same way, a PE must be able to receive data from its three horizontal neighbors; this is illustrated in FIGS. 4a and 4b.

Figure 5A:
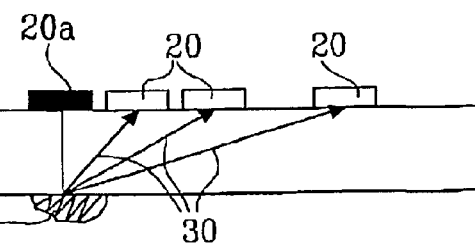
FIG. 5a shows one embodiment of the invention using beam splitters to reduce the number of horizontal sending transmitters with a factor of three.

Using diffractive elements, it is easy to create beamsplitters, i.e., to use the optical fan-out property. If beamsplitters are used, the number of horizontal transmitters are reduced with a factor of three, and thus the hardware cost is reduced without destroying the hypercube topology as shown in FIG. 5a. However, some kind of channel time-sharing must be used, when different data must be sent to all three neighbors at the same time, since only a single transmitter is available.

More important, since beamsplitting is not limited to one direction, the number of transmitters is reduced with a factor of six (provided that 6D-hypercubes are used). But, most important, if the hypercube transpose algorithm described by Foster, (I. Foster *Designing and Building Parallel Programs: Concepts and Tools for Parallel Software Engineering*, Addison Wesley Publishing Company, Inc., Reading, Mass., USA, 1995) to perform corner turning, no performance is lost, even if the number of transmitters are reduced with a factor of six, compared to a system without beamsplitters. Thus, data is only exchanged in one dimension at a time. Note, however, that the hypercube transpose algorithm sends (log P)/2 times more data and P/log P fewer messages, in total, compared to a simple transposition algorithm also described in Foster (P is the number of processing elements). Therefore, the hypercube transpose algorithm is preferable when transfer costs are low and message startups are expensive. As a result, optical interconnects with its slightly higher startup cost and high bandwidth typically matches the transpose algorithm behavior better than pure electrical wires.

Figure 5B:
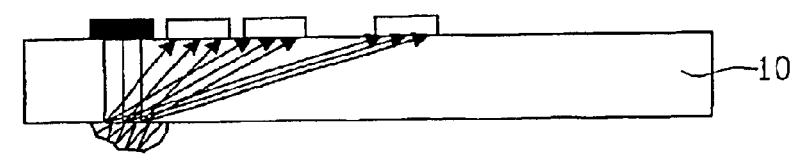
FIG. 5b shows beam splitters used to increase the flexibility and multicast capacity in the network, at the expense of more receivers, but without additional transmitters.

Beamsplitters can also be used to create an advanced hypercube topology with more capacity than the original, at the expense of more receivers, but without additional transmitters, as shown in FIG. 5b. Obviously, other hybrid topologies can be created with beamsplitters.

Step 3: Reduction of transmitters.

As no loss of performance is occurred, even if the number of transmitters is reduced with a factor of six, when performing corner turning with the hypercube transpose algorithm, the use of beamsplitters depicted in FIG. 5a is preferred. However, the light beam is split in both horizontal and vertical directions, and thus the number of transmitters is reduced maximally.

In FIG. 3, for instance, it is fully possible to use a single receiver for all beams. In that case, all processing elements must be synchronized in the hypercube; to be able to use some kind of time division multiple access, and thus avoid data collisions. With planar packaging technology, a synchronization clock channel is relatively easy to implement. J. Jahns, "Planar packaging of free-space optical interconnections", *Proceedings of the IEEE*, vol. 82, no. 11, November 1994, pp. 1623–1631 has, for instance, described a 1-to64-signal distribution suitable for, e.g., clock sharing, with planar technology.

Step 4: 3D-hypercubes.

In FIG. 6b, all transmitters and receivers in one row have been added. This corresponds to the topologically of a 3D-hypercube.

Step 5: 4D-hypercubes.

Figures 7A, 7B:
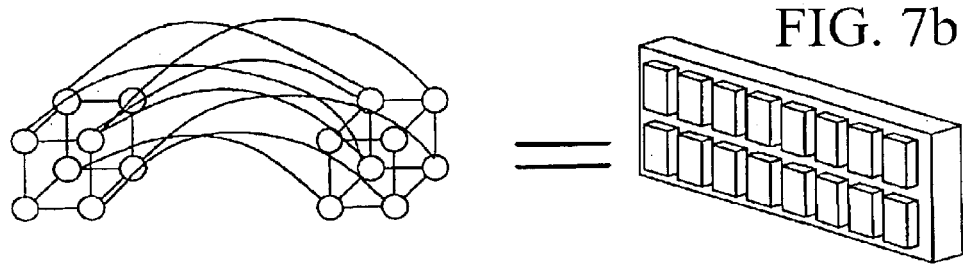
FIG. 7a shows a first extension in vertical direction of two 3D-hypercubes forming a 4D-hypercube from the topological view.
FIG. 7b shows a first extension in vertical direction of two 3D-hypercubes forming a 4D-hypercube from the physical view.

To realize hypercubes with higher dimensions than three, the vertical direction is used. In FIGS. 7a and 7b, a 4D-hypercube is shown both topologically and physically. The fourth dimension makes use of vertical space.

Step 6: 6D-hypercubes.

Figures 8A, 8B:
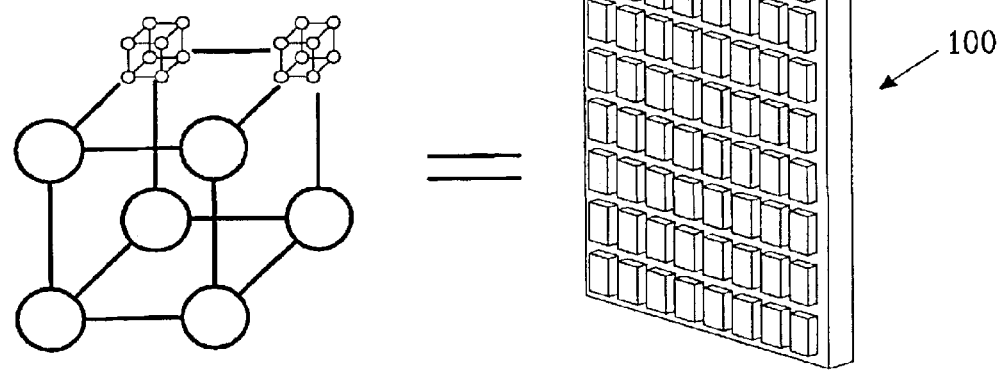
FIG. 8a shows the one embodiment of the entire computational unit--a 6D-hypercube from the topological view.
FIG. 8b shows the one embodiment of the entire computational unit—a 6D-hypercube from the physical view.

A 6D-hypercube makes full use of both horizontal and vertical space, as shown in FIGS. 8a and 8b. This physical layout corresponds to a full computational unit.

If it is impossible to obtain the required performance with one computational unit, several computational units must co-operate. Also, since almost all applications in ESP-systems can be divided into computational parts that only need to send data forward to the next stage in a chain, it is natural to connect the computational units in a pipelined manner, as shown in FIG. 9.

In FIG. 9, all PEs 20, e.g., in the leftmost plane can send data to the middle plane. But a single PE in the leftmost plane can only send data to an equivalent PE in the middle plane. In the same way, the middle plane sends data but only to the rightmost plane.

In order to make the inter-module communication work, the substrates are provided with openings, i.e., the light-beams are allowed to propagate via a lens 50 from a previous unit, and also out to the next unit, as shown in FIG. 10. In addition, diffractive elements can be added to guide the incoming beams 30 inside the substrate, to be able to reach the right PE.

In FIG. 10, the lenses 50a and 50b needed to connect different computational units 20 are shown. Specially, FIG. 10a shows the bottom surface lens, while FIG. 10b shows the top surface lens. FIG. 10c shows the top view. Note that the bottom lens 50b in this figure is shown through the substrate.

By allowing communication in both directions, i.e., letting a module be able to send and receive data both forward and backward, a 7D-hypercube is actually formed by two planar arrays, as shown in FIGS. 11a and 11b. If more than two planes form an extended computational unit, the pure hypercube topology will not be preserved since only adjacent planes can communicate with each other. This, however, is not a limitation in many signal-processing systems, due to the pipelined nature of the data flow.

If only one mode of operation is needed in the system, it is possible to create a streamed architecture for that purpose. However, since it is very important for many ESP-applications, e.g., including airborne radars, to change mode of operation on the same system as needed in the application, an architecture capable of multimode operations is preferred. Thus, different clusters of computational units must be capable of working together in different ways.

The pipelined system described in here has very good potential for mapping of different algorithms in various ways. In fact, the system can be partitioned in all three spatial dimensions. An example of this is shown in FIG. 12, in which four different algorithms are mapped at the same time, on four smaller systems of pipelined 4D-hypercubes. It is also possible to create 5D-hypercubes inside each of these four smaller systems by connecting two 4D-hypercubes in different planes.

To be able to increase the system performance, hardware scalability is of great importance. In the proposed system, higher performance can be achieved by:

a) Adding more planar arrays in the chain,
b) Enlarging physical size of the planes, or
c) Adding more PEs within a plane, i.e. increasing the hypercube dimension, by either b) or denser packaging.

In the preferred embodiment, inter-module links are free-space optical interconnections and all modules are identical; this facilitates the adding of more planes. However, special attention must be paid to how the modules are stacked onto each other; e.g. heat removal etc. must be taken into account.

If the required performance exceeds the computational load in one unit, i.e. a substrate, several units have to co-operate. Also, to make these units to efficiently work together, massive interconnections are necessary. One way to interconnect several units is to place them in a succession as in FIG. 9. The drawback of this arrangement is that each plane only can send data forward and backward to the subsequent and the previous plane respectively. However, this arrangement fits the pipelined computational nature in most radar systems, and is therefore a good choice for such applications. Moreover, this pipelined system of hypercubes, can, in fact, be partitioned in all three spatial dimensions. For instance, two adjacent 6D-hypercubes form a 7D-hypercube, a plane divided into four equal squares forms four 4D-hypercubes, and, finally, two planes of four 4D-hypercubes each can form four 5D-hypercubes together. As a result, many modes of operation can be executed on the system, and this important for example in radar applications.

Figure 13:
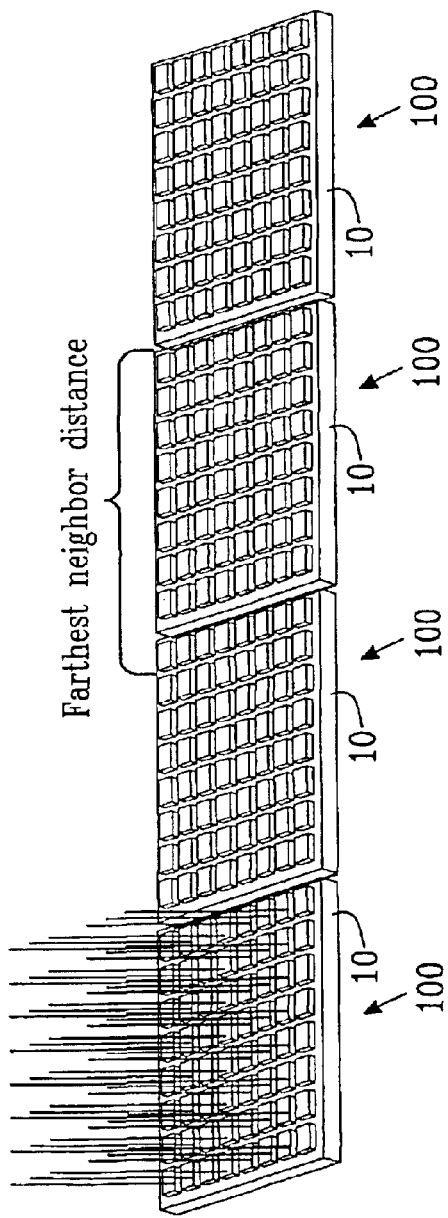
FIG. 13 shows an alternative implementation of the pipelined system of optical planar-packaged hypercubes according to the invention.

An alternative implementation of FIG. 9 is shown in FIG. 13. In this case, the pipelined system of planar-packaged hypercubes is merged into one large rectangular unit. The substrates 10 are arranged side by side and connected together by means of connectors, lenses, optical fibers etc.

As can be seen in FIG. 13, the maximum light bounce distance is only the farthest neighbor distance, and not the whole length of the substrate.

The advantages of one large unit are many, for instance, the light beams only travel in one material compared to two (open-air is the other), no temperature dependent displacement problems between different substrates occur, and no need for opening up the substrates to allow the beams propagate in and out between computational units, etc. On the other hand, the light beams must travel twice the distance within the substrate, and to the opposite of displacement problems, inflection must be evaluated. Furthermore, system expandability is also limited compared to the other implementation shown in FIG. 9, where more planes are added, if the system performance is inadequate.

Figure 14:
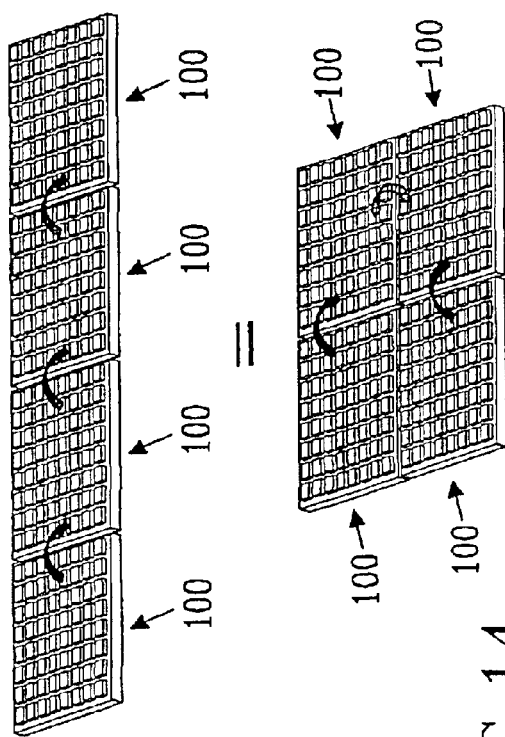
FIG. 14 is another equivalent system of pipelined hypercubes.

A third equivalent system of pipelined hypercubes is shown in FIG. 14. However, the square-shaped system shown in the lower part can be regarded as a one-plate system, i.e. as a single plane in FIG. 9. It is of coarse possible to add more transfer channels.

In the following, a number of exemplary applications based on the teachings of the invention will be described to illuminate the advantageous obtained through the present invention. As exemplary systems, an airborne STAP-radar and a ground based radar applications are selected. The airborne system has extreme demands on the computational load and moderate requirements on the inter-processor communication. The ground-based radar, on the other hand, has extreme demands on the inter-processor communication and moderate requirements on the computational load. As a result, the new architecture must be capable of handling both high system load and high inter-processor data transfers.

Space Time Adaptive Processing (STAP) is a technique used in radar systems to support clutter and interference cancellation in airborne radars. However, the full STAP-algorithm is of little value for most applications since the computational workload is too high and it suffers from weak convergence. Therefore, some kind of load-reducing and fast convergent algorithm is used.

For instance the $n^{th}$-order Doppler-factored STAP. This STAP algorithm is, in addition to the medium ($1^{th}$-order) and the hard ($3^{rd}$-order) real-time STAP is used as a first example. Thus, the computational load is increased numerous times compared to the $3^{rd}$-order STAP benchmark mentioned above. The reason for this increase is manifold, e.g., 64 instead of 22 processing channels, a higher order Doppler-factored STAP ($5^{th}$-order compared to $3^{rd}$-order), and a higher sampling rate etc.

The following system parameters are assumed for the airborne radar system:
64 processing channels (L)
$5^{th}$-order Doppler-factored STAP (Q)
32.25 ms coherent pulse interval (CPI) ($\tau$)
960 samples (range bins) ($N_d$) per pulse after decimation with a factor of four
64 pulses per CPI and channel ($C_p$)
8 Gbit/s efficient data transfer rate of a single link in one direction ($R_{link,eff}$)

Because of the real-time nature of the system, a solution must be sensitive to low latency. Therefore, a latency requirement of 100 ms, i.e. a maximum latency of 3τ to perform all calculations in the STAP-chain from the input stage to the final stage is determined.

Figure 15:
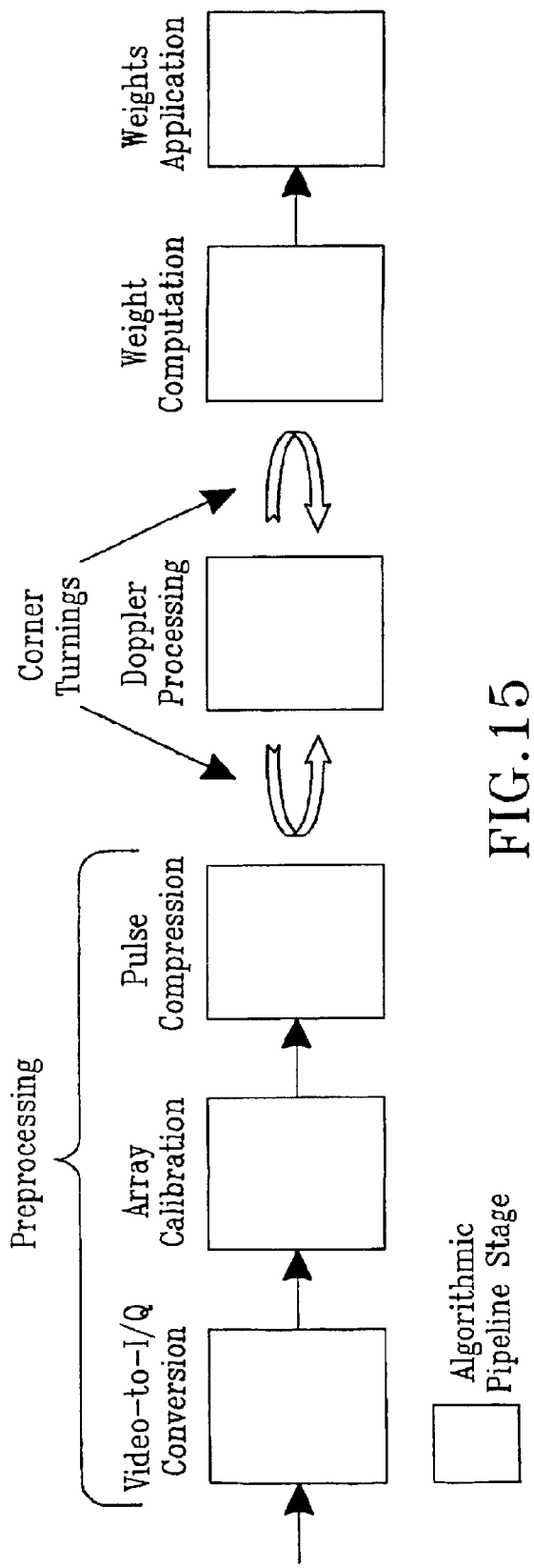
FIG. 15 is a block diagram illustrating the algorithmic pipeline stages in an airborne STAP-radar system.

In FIG. 15, the algorithmic pipeline stages for the chosen STAP-algorithm is shown. The chain 150 consists of six pipeline stages, namely, video-to-I/Q conversion 151, array calibration 152, pulse compression 153, Doppler processing 154, weights computation 155 and finally weights application 156.

Table 1 below shows the computational load in each stage. The load is measured in floating-point operations per coherent pulse interval (and not per second). Note that all floating-point calculations are derived from equations in K. C. Cain, J. A. Torres, and R. T. Williams, "RT_STAP: Real-time space-time adaptive processing benchmark", MITRE Technical Report, The MITRE Corporation, Center for Air Force C3 Systems, Bedford, Mass., USA, 1997 (Cain). Note also that the array calibration and the pulse compression stages are combined in Table 1.

TABLE 1

| Pipeline stage | Flops per CPI |
| --- | --- |
| Video-to-I/Q-conversion | $4.56 * 10^8$ |
| Array cal. and pulse comp. | $4.51 * 10^8$ |
| Doppler processing | $1.28 * 10^8$ |
| Weights computation | $5.05 * 10^{10}$ |
| Weights calculation | $1.57 * 10^8$ |

Clearly, the hardest stage to calculate is the weights computation (a factor of 100 times more calculations than the other stages).

In a first stage, it is assumed that one processor with its own memory is used. If all calculations are performed with one processor, $5.17*10^{10}$ floating-point operations must be executed during one CPI. This corresponds to a sustained performance of more than 1.6 TFLOPS (Tera Floating Point Operations Per Second) and this is too high for a single processor. As a consequence, the per-processor load must be reduced through using several processors and by using the maximum allowed operation time, i.e. the maximum latency (three CPIs). The extended working time is achieved by pipelining some computational parts in the chain. By using many processors, the time spent in inter-processor communication will be noticeable and must be included in the calculations.

Figure 16:
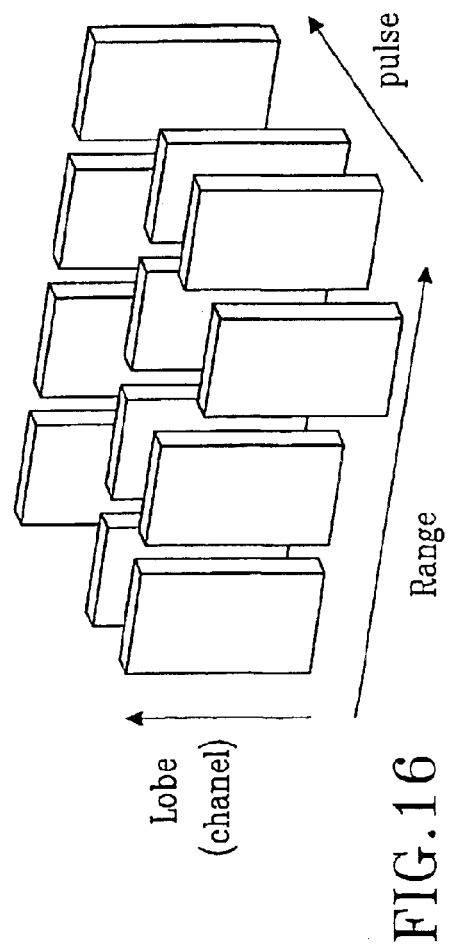
FIG. 16 shows schematically distribution of QR-decompositions in a datacube.

Since the weights computation stage 155 is the most critical, it is analyzed first. In this stage, QR-decompositions dominate the computational complexity. A QR-decomposition is a numerically stable method to triangularise matrices. The total number of QR-decompositions to compute in the entire datacube depends on the chosen algorithm. In this example one QR-decomposition is performed on a matrix covering one fourth of all range samples in one pulse, and over all corresponding channels (lobes), as shown in FIG. 16. This division requires, however, that the datacube is redistributed from a Doppler oriented view to a range oriented view, i.e., a corner turn in either the Doppler processing stage or in the weights computation stage is performed. Since the computational load is almost two magnitudes higher in the weights computation stage, the corner turn is avoided here. Also, to avoid extremely high inter-processor communication, a single QR-decomposition calculation is avoided on more than one processor. This means that the maximum number of processors to be uses is 256, to calculate the weights. To reduce the per-processor load even further, the system scalability can be used and the computational work can be divided on two working chains, see FIG. 18. In this figure, every other datacube (odd numbered) to be processed follows the upper arrow, arrow (a), to the dark colored group of processors. Similarly, the even numbered datacubes follow the lower arrow, arrow (b), and is processed by the light colored group of processors. Each group of processors in FIG. 17 consists of eight 5D-hypercubes, i.e. 256 processors each. By dividing the computational work on two working chains, it is possible to extend the computational time on a single datacube twice, to two CPI and thus reduce the per-processor work to the half. Through including the load in weights application into the weights computation stage, $5.07*10^{10}$ Flops on 256 processors must be executed during a time of 2τ, i.e. a sustained per-processor floating-point performance of 3.07 GFLOPS, which is fully acceptable.

In the remaining computational stages, i.e. the video-to-I/Q conversion 151, array calibration 152, pulse compression 153, and the Doppler processing stage 154, altogether a total of $1.03*10^9$ Flops must be performed during one CPI (the remaining time of the maximum latency) minus the time it takes to perform two corner turns, as shown in FIG. 15, and minus the time it takes to distribute data to all processors in the weights computation stage.

To be able to calculate the corner turn time, the size of the datacube must be known. The total number of samples used in every coherent pulse interval in the algorithm is $LN_dC_p$. Since every sample is complex and the real and imaginary part both are 32 bit, the total size ($D_{size}$) of the datacube is ≈252 Mbit. As a result, it will take, $t_{CT}$=1.47 ms to perform a corner turn on a 6D-hypercube with 64 processors (P=64), and 0.86 ms on a 7D-hypercube with 128-processors, according to Equation 1 and the system parameters given above.

Figure 17:
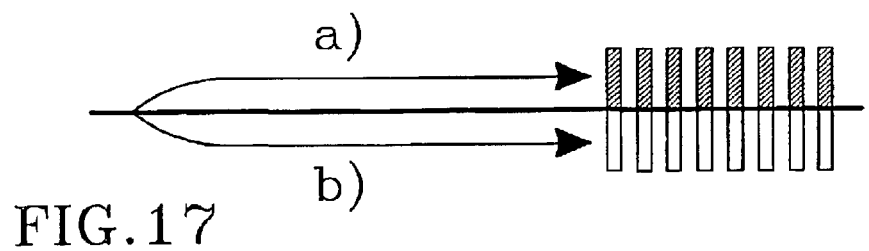
FIG. 17 shows two alternating working chains in the weights computation stage extend the working time and reduce the per-processor load.

Next, the time it takes to distribute data to correct cluster of 5D-hypercubes in the weights calculation stage, i.e. either among path a) or b) in FIG. 17 is calculate. First, the datacube is fold, to match the 5D-hypercube size. This time calculation is equivalent to Equation 1, except that data is only moved among one direction in one dimension, i.e., log (P) is replaced with 1 and P with P/2. Starting from a 6D-hypercube, data is folded once, but since the start is from a 7D-hypercube, the time it takes to fold the data from a 7D- to a 6D-hypercube is added first. Next, all data is moved to the first 5D-hypercube, which in turn must move ⅞ to the next 5D-hypercube in the chain etc. This data movement can, however, be pipelined, i.e. as soon as the first hypercube receives its first data, it starts to forward this data to the next cube etc. The total time to distribute data to all 5D-hypercubes from a 6D-hypercube and a 7D-hypercube is, therefore, $t_D$=1.47 ms and 1.72 ms respectively. The time left to calculate $1.03*10^9$ Flops in a 6D-hypercube is thus 27.84 ms (τ−2 $t_{CT}$−$t_D$), i.e., a sustained per-processor floating-point performance of 578 MFLOPS. This is well below the per-processor load needed in the weights computation stage. As a result, using a 7D-hypercube in the rest of the chain is not necessary. (The per-processor load using a 7D-hypercube is 279 NFLOPS.)

Figure 18:
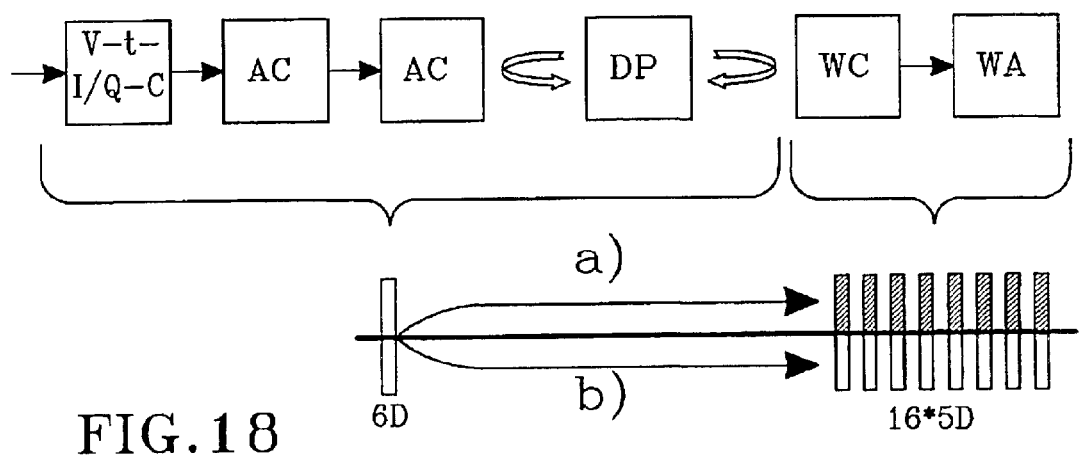
FIG. 18 is a block diagram illustrating final airborne radar system, one 6D-hypercube and sixteen 5D-hypercubes, i.e. 576 processors.

The final airborne system consists, therefore, of nine pipelined optical substrates, i.e. 576 processors, according to FIG. 18. The operation will be as follows:

1. Pre-processing, Doppler processing, and two corner turns are performed on the same 6D-hypercube.
2. If the datacube is numbered odd, fold it and distribute it to the upper cluster of eight 5D-hypercubes (arrow a) in FIG. 18. If the datacube is numbered even, fold it and distribute it to the other cluster of 5D-hypercubes (arrow b) in FIG. 18. This distribution is carried out in the same time interval as step 1.

3. Next, weights computation and application are both performed on the same working cluster of eight 5D-hypercubes and during a time period equal to 2 CPIs.

In a ground based radar system, as already mentioned, especially the ground based 128-channel radar system; there is less demand for floating-point than the airborne system. However, the inter-processor communication demands are higher. Both personalized and broadcasting all-to-all communication occurs. The following system parameters are assumed for the ground based radar system:
128 processing channels (L)
400 kHz max pulse rep. freq. ($f_{PRF}$)
10 ms coherent pulse interval (CPI) ($\tau$)
6.25 Msample per second and channel ($N_s$)
8 Gbit/s efficient data transfer rate of a single link in one direction ($R_{link,eff}$)

Figure 19:
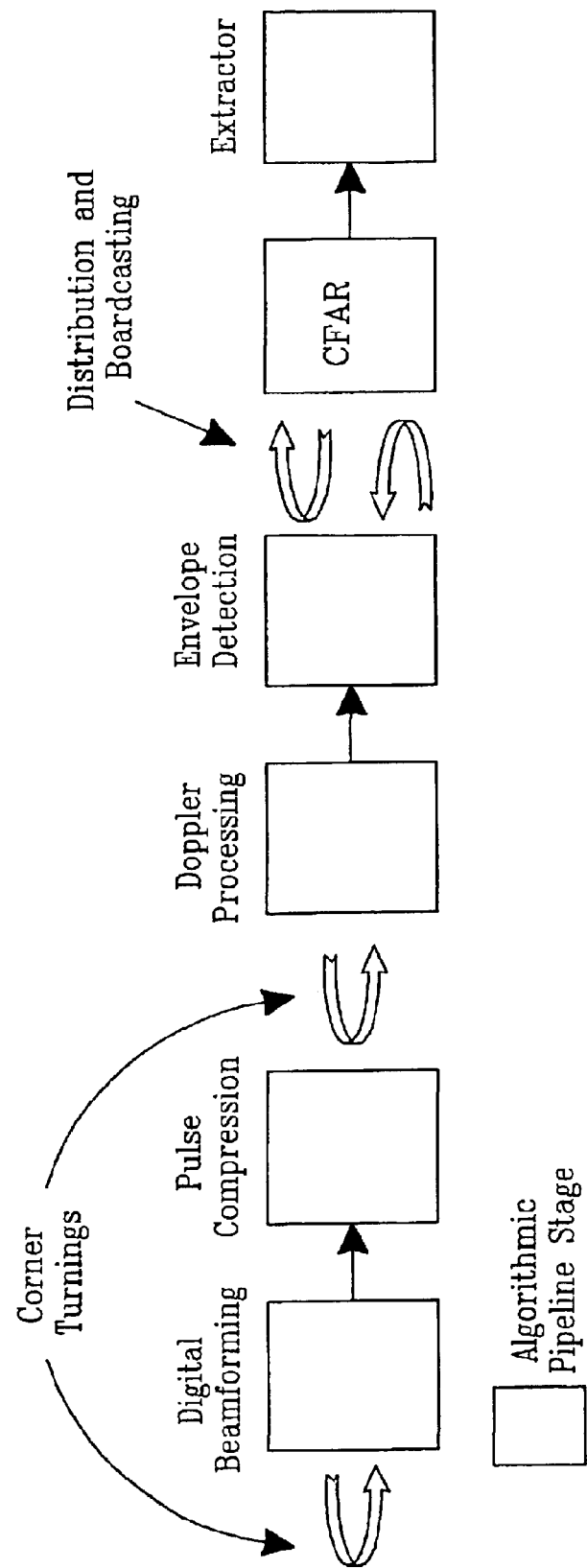
FIG. 19 is a block diagram illustrating the algorithmic pipeline stages in a ground based radar system.

In FIG. 19, the algorithmic pipeline stages for the chosen algorithm is shown. The chain 190 consists of six pipeline stages, namely, digital beam forming 191, pulse compression 192, Doppler processing 193, envelope detection 194, Constant False Alarm Ratio (CFAR) 195, and extraction 196. The computational load for all but the extraction stage is shown in Table 2.

TABLE 2

| Pipeline stage | Flops per CPI |
| --- | --- |
| Digital beamforming | $2.80 * 10^8$ |
| Pulse compression | $1.02 * 10^9$ |
| Doppler processing | $4.72 * 10^8$ |
| Envelope detection | $3.20 * 10^7$ |
| CFAR | $2.75 * 10^9$ |

The CFAR-stage reduces data greatly, thus the extractor neither needs much computational power nor much communication time compared to the other stages. Therefore, no specific calculations are presented here, and one can actually assume that the extractor stage can be calculated in the CFAR stage. As in the airborne case, the load is measured in Flops per CPI. Note, however, that the CPI here is only 10 ms compared to 32.25 ms as in the airborne case, which means that the time spent in inter-processor communication is more important. The maximum latency is $3\tau$, i.e. 30 ms.

The purpose of the CFAR-process is to reduce the number of possible targets in each CPI, by only allowing a constant number of false items during a given time. This process can be carried out in different ways. Seen from a communication view, the simplest CFAR-method only works in one dimension, usually in the range, and the hardest method works in several dimensions, with the neighborhood defined as a volume. In addition, many different CFAR-techniques can be used in every communication case, and the computational load is usually not a problem. As a consequence, many designers have to choose CFAR-method based on the speed of the inter-processor network and not on the processor performance. Here, however, the choice of CFAR-method is not critical, since our network is designed for fast communication. Therefore, a method based on ordered statistics- CFAR is chosen, where the surrounding neighbors in all three dimensions (pulse, range, and channel) are ordered in amplitude. The cell under test (CUT) is considered as a possible target if its value, multiplied with a certain constant, is larger than k neighbor cells. In this case, the neighborhood is a 7×7×7 volume, i.e. k is 342. This also means that each cell has to be distributed to all other nodes that calculate ordered statistics on a CUT belonging to the cell's neighborhood.

In accordance with the airborne system, i.e. calculation of the total load of the system if only one processor is used, the result here is $4.55*10^9$ Flops per CPI. This corresponds to 455 GFLOPS and is too much for a single-processor solution. Therefore, the computations are divided on several processors and use the maximum available latency.

As can be seen in FIG. 19, two corner turnings must be performed before the CFAR stage. At first, data is sampled per channel, i.e. each node receives data from one or several channels. However, digital beam forming works in the channel dimension. Thus, data is redistributed in such way that each node takes care of all data from all ranges and channels in one or more pulses. In the same way, a second corner turn is carried out before the Doppler stage, since data is processed among the pulse dimension in Doppler processing.

The size of the datacube to be corner turned is $LN_s \tau$ samples. Every sample is complex and consists of 64 bits. $D_{size}$ is, therefore, 512 Mbit. As a result, it will take $t_{CT}=3$ ms to perform a corner turn on a 6D-hypercube with 64 processors (P=64), and 1.75 ms on a 7D-hypercube with 128-processors, according to Equation 1 and the system parameters given above.

If digital beam forming, pulse compression, Doppler processing, and envelope detection is performed during the same time period, $1.80*10^9$ Flops during an interval of $\tau-2t_{CT}$ must be performed. This gives a sustained per-processor performance of 7.05 GFLOPS on a 6D-hypercube and 2.17 GFLOPS on a 7D-hypercube. Thus, a 7D-hypercube is chosen.

In the CFAR-stage, as mentioned above, each cell has to be distributed to all other nodes that calculate ordered statistics on a CUT within the cell's neighborhood. This is not a trivial problem, and it is not a full broadcasting. However, even if it is not a full all-to-all data transfer that has to be carried out, it is possible to at least guarantee that we are on the right side of the time limit if full broadcasting is calculated, i.e. all nodes copy data to all other nodes.

If a node's storage capacity as the limiting factor is disregarded, the time it takes to perform a full broadcasting with $M=D_{size}/P$ on a 6D-hypercube, is 31.5 ms, according to Equation 3. This is way too much (even more than the maximum latency allowed). Note that $D_{size}$ is only 256 Mbit now, since the envelope detection stage has converted the complex samples to real 32-bit values. We, therefore, need to reduce the per-processor data transfer size, M, by dividing the datacube over more than one computing hypercube. Also, the operational time by using several working chains in the CFAR-stage is extended (in same way as in the weights computation stage in the airborne system, see FIG. 17). To distribute data to several planes will, of course, require more time. The overall communication time, however, will be reduced, since the time spent in broadcasting using several planes is greatly reduced.

Figure 20:
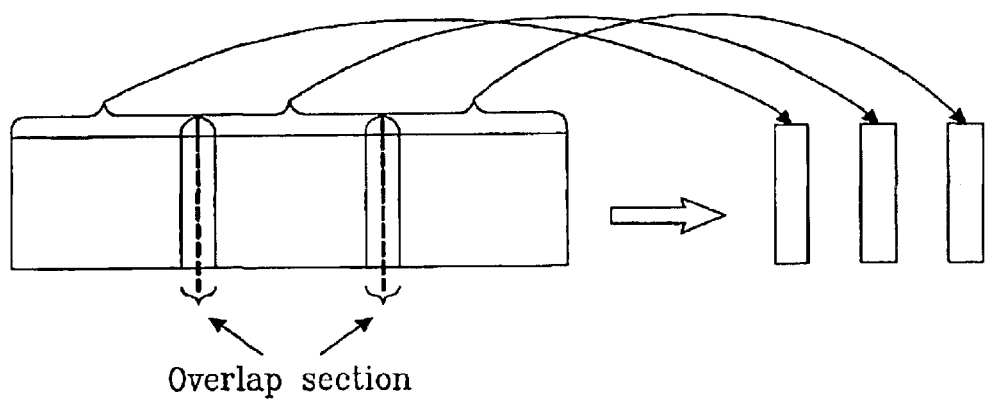
FIG. 20 is a schematic view over a datacube divided into three fractions.
Figure 21:
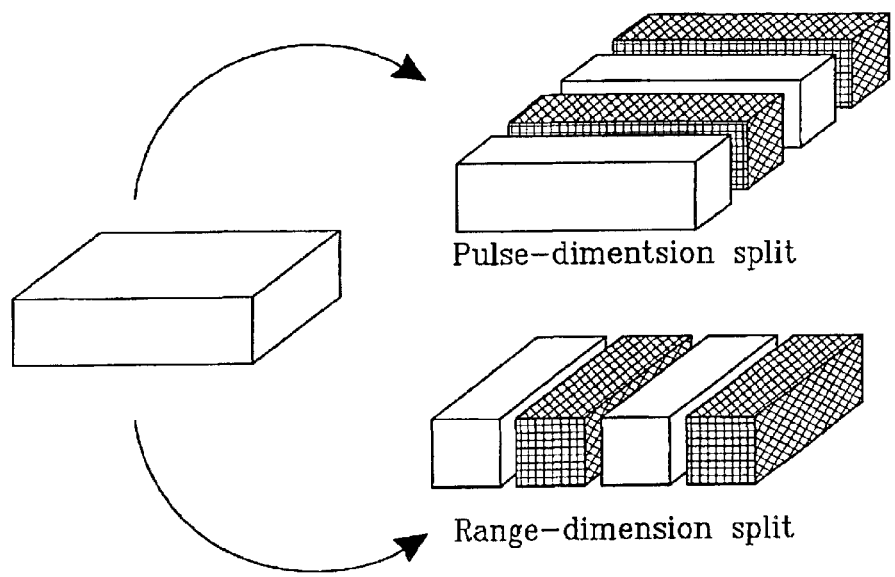
FIG. 21 illustrates a block diagram of data divided either in a pulse dimension or in a range dimension.

At first, this inter-plane data distribution seems to be a trivial problem, just divide each nodes data into equally parts, and transfer these plus the overlap needed forward, see FIG. 20. But, since the datacube can be shaped into different forms (depending on the pulse repetition frequency), the datacube can be divided into the pulse dimension or in the range dimension, see FIG. 21. This division is carried out in that dimension which gives lowest possible size in data overlap. This will also reduce the broadcasting time. Our policy is therefore:

1. If # range bins ($B_R$) <# pulse bins ($B_P$), divide among the pulse dimension, i.e. according to FIG. 21a.
2. If $B_R \geq B_P$, divide among the range dimension, i.e. according to FIG. 21b.

The maximum distribution and broadcasting time will appear when the number of range bins are equal to the number of pulse bins. The number of samples per channel during one CPI is $N_s\tau=6.25*10^4$. This corresponds to $B_R=B_P=250$. If the neighborhood is 7×7×7, the overlap section in FIG. 9 will be six bins. The overlap that has to be sent forward, δ, is thus three bins. The size for one overlap in the whole datacube is therefore:

$$o_{size} = \delta \min(B_R, B_P) L \quad (4)$$

This give us the maximum $o_{size}=3*250*128=96,000$ samples or 3.072 Mbit.

The amount of data to be distributed if only two hypercube units are used is ½ $D_{size}+o_{size}$. If three hypercube units are used, first ⅔ $D_{size}+o_{size}$ are transmitted to the intermediate unit, and then ⅓ $D_{size}+o_{size}$ to the last unit. This last transmission will, however, be pipelined with the first. If even more clusters of hypercubes are used, all transmissions will be pipelined. The data distribution time to x clusters is therefore:

$$t_{dist}(x) = \frac{\frac{x-1}{x}D_{size} + o_{size}}{R_{link}P_{cluster}}; \quad x > 1, \quad (5)$$

where $P_{cluster}$ is the number of processors within one hypercube. Note, however, that the equation above is not valid if the hypercubes have been created from groups of two adjacent planes, e.g., two planes divided into two 5D-hypercubes each, are merged to two inter-plane 6D-hypercubes instead. The reason for this is that the bandwidth between two inter-plane hypercubes is limited. In addition, the transmission time also increases if inter-plane hypercubes are used, since broadcasting must be performed over an extra (unnecessary) dimension. The broadcast time within a cluster is then (based on Equation 3):

$$t_{broadcast}(x) = \frac{(P_{cluster}-1)\left(\frac{D_{size}}{x} + 2o_{size}\right)}{R_{link,eff}P_{cluster}} \quad (6)$$

Note that x must be greater than 1. Note also that an intermediate broadcasting unit must share $o_{size}$ data with both the previous and the next unit, hence the double $o_{size}$ term above. Total time left to calculate the CFAR is then:

$$t_{left}(x) = t_{period} - t_{dist}(x) - t_{breakdown}(x); \quad x>1 \quad (7)$$

where $t_{period}$ is the maximum time period to use in the CFAR stage. As mentioned above, several computational chains can be used to extend the working time. Note, however, that it is undesirable to use more than two working chains here, since the $t_{period}$ is always less than $2\tau$ if the maximum latency is $3\tau$ and the other stages work during $1\tau$, and thus only two working chains can be busy at the same time. If, however, the maximum latency was longer, e.g. $5\tau$, more working chains could be busy at the same time. Apart from that, a maximum latency of $3\tau$ means that the only suitable configuration in the CFAR-process is to use two working chains of 5D-hypercubes each. $t_{period}$ will then be $2\tau$ minus the time it takes to fold data from a 7D-hypercube to a 5D-hypercube. The folding time for a 256 Mbit datacube from a 7D- to a 5D-hypercube is 0.75 ms, according to the modified Equation 1 discussed in the airborne system.

Using all equations above give us the expression for the sustained per-processor load:

$$CPU_{load}(x) = \frac{\frac{2.75*10^9}{xP_{cluster}}}{t_{left}}; \quad x > 1 \quad (8)$$

In Table 3, the per-processor load for two to six 5D-hypercube working units are shown. Since it

TABLE 3

| Number of 5D-hypercubes in the working chain (x) | Per-processor load in GFLOPS |
|---|---|
| 2 | 17.22 |
| 3 | 3.82 |
| 4 | 2.15 |
| 5 | 1.50 |
| 6 | 1.15 | is undesirable to exceed a per-processor load of 3 GFLOPS, a system with four 5D-hypercubes is selected. The sustained per-processor load is then 2.15 GFLOPS, which is well below the unwanted limit. As a consequence, the extraction stage can hopefully be calculated during the same time period.

Figure 22:
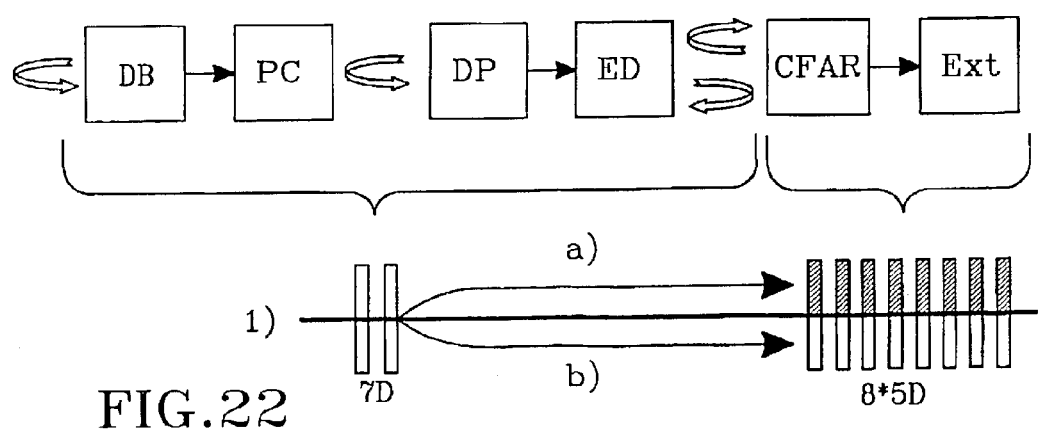
FIG. 22 illustrates a block diagram of data divided either in a pulse dimension or in a range dimension.

Therefore, the final ground based system consists of six pipelined optical substrates, i.e. 384 processors, as shown in FIG. 22. The operation will be as follows:

1. Digital beamforming, pulse compression, Doppler processing, envelope detection, and two corner turns are performed on a 7D-hypercube during the first CPI.
2. Fold the datacube twice (from 7D to 5D). Prepare to divide it among the pulse or range dimension depending on the shape of the datacube in the previous stage, and finally, distribute the fractions to the upper cluster of four 5D-hypercubes (arrow a) in FIG. 11, if the datacube is numbered odd. If the datacube is numbered even, distribute it to the other cluster of 5D-hypercubes (arrow b) in FIG. 22.
3. Compute the CFAR and the extraction stage on the same cluster as described above during the rest of the time available.

Figure 23:
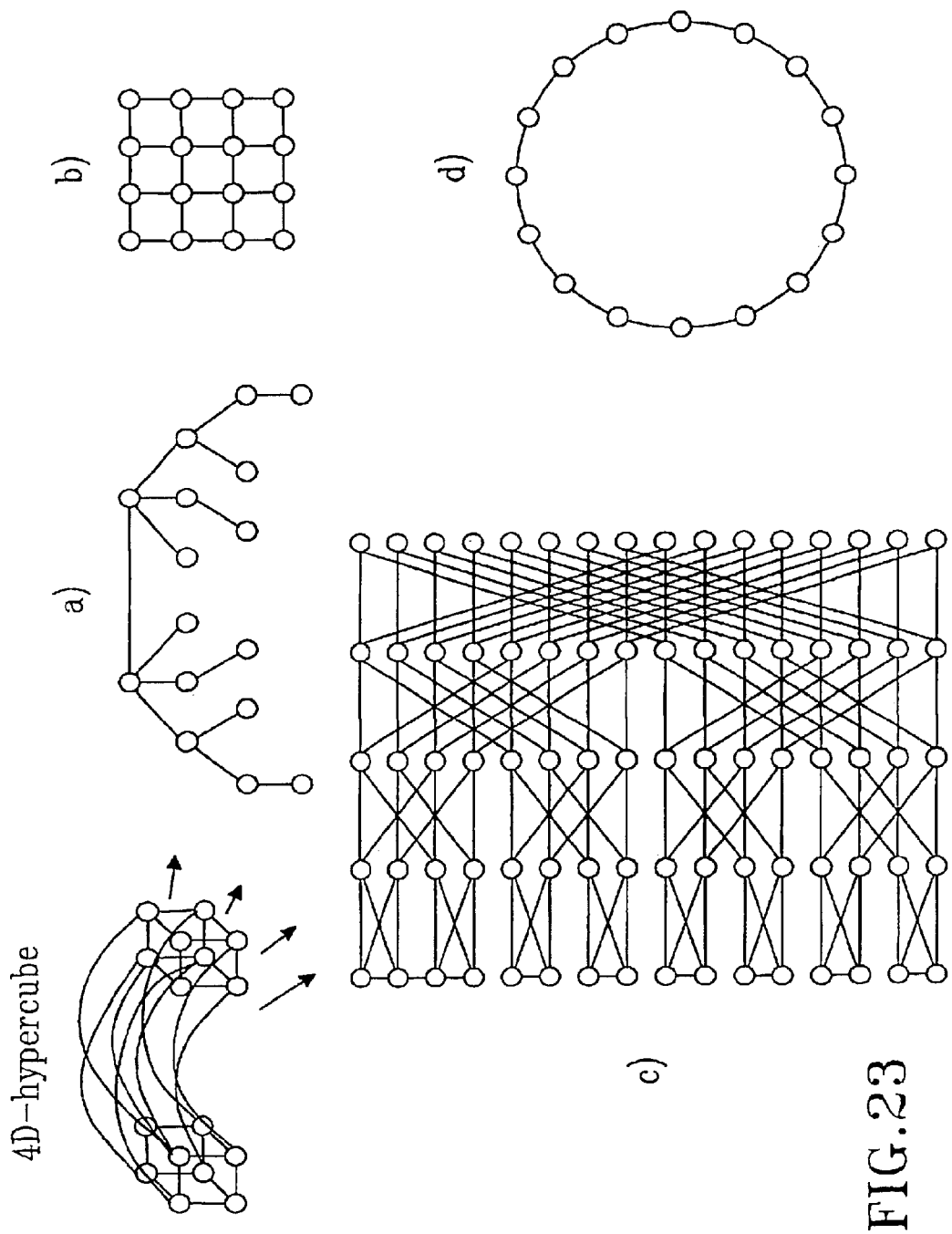
FIG. 23 illustrates examples of different topologies embedded in a hypercube.

FIGS. 23a–23c illustrate the flexibility of the hypercube. In this figure a 4D-hypercube has four other topologies, a. a spanning tree, b. a mesh, c. a butterfly and d. a ring. The butterfly is very interested for both radar and router applications. The invention is in particular interesting for router applications where a huge amount of data traffic must be handled.

The invention is not limited to the shown and described embodiments but can be varied in a number of ways without departing from the scope of the appended claims and the arrangement and the method can be implemented in various ways depending on application, functional units, needs and requirements etc.

What we claim is:

1. An arrangement for embedded signal processing, comprising a number of computational units, each computational unit comprising a number of processing elements, each processing element arranged to work independently and transmit data simultaneously, wherein said computational units are arranged in clusters, each computational unit being arranged to work independently and transmit data simultaneously, and that said processing elements being interconnected globally and regularly through optical connection in a hypercube topology and transformed into a planar waveguide.

2. The arrangement of claim 1, wherein said optical connection is a free-space connection.

3. The arrangement of claim 1 wherein each computational unit comprises at least one transparent substrate having a first and a second surface, at least one of said surfaces being arranged with said processing elements, and wherein said processing elements are interconnected to each other and to processing elements of at least one neighboring computational unit through optical connection.

4. The arrangement of claim 1, wherein at least one of said surfaces is reflective and that said optical interconnection in each substrate is achieved through reflection on said reflective surface.

5. The arrangement according to claim 1, comprising beam splitting arrangements for said optical interconnection in each substrate.

6. The arrangement according to claim 5, comprising a device for channel time-sharing for transmission of different data sent to all neighbors at the same time.

7. The arrangement according to claim 1, comprising optical elements on each substrate for said optical interconnection between the substrates.

8. The arrangement according to claim 1, said computational units are identical.

9. The arrangement according claim 8, wherein said computational units are stacked.

10. The arrangement according to claim 1, wherein said computational units are arranged side by side.

11. The arrangement according claim 10, wherein said computational units are interconnected by means of optical fibers.

12. The arrangement according to claim 1, wherein said hypercubes are pipelined and partitioned in several spatial dimensions.

13. The arrangement according to claim 1, wherein computational units are arranged in a hypercube topology forming an interconnection network within said arrangement.

14. The arrangement according to claim 1, wherein said processing elements are arranged according to planar packaging technology.

15. A method of providing an arrangement for embedded signal processing, the arrangement comprising a number of computational units, each computational unit comprising a number of processing elements that work independently and transmit data simultaneously, the method comprising the step of arranging said computational units in clusters that operate independently and transmit data simultaneously, optically interconnecting said processing elements globally and regularly in a hypercube topology and transforming said hypercube into a planar waveguide.

16. An airborne radar system comprising a data processing unit for Space Time Adaptive Processing (STAP), said data processing unit comprising a number of computational units, each computational unit comprising a number of processing elements that work independently and transmit data simultaneously, wherein said computational units are arranged in clusters and work independently and transmit data simultaneously, and wherein said processing elements are globally and regularly interconnected through optical connection in a hypercube topology and transformed into a planar waveguide.

17. The airborne radar system of claim 16, wherein said processing unit is arranged to function as a video-to-I/Q conversion unit, array calibration unit, pulse compression unit, Doppler processing stage, weights computation unit and weights application unit arranged in pipeline stages.

18. The airborne radar system of claim 17, wherein said video-to-I/Q conversion unit, array calibration unit, pulse compression unit and Doppler processing stage are arranged as a six-dimensional hypercube.

19. The airborne radar system of claim 17, wherein said weights computation unit and weights application unit are arranged as number of five-dimensional hypercubes.

20. A ground based radar system comprising a data processing unit comprising a number of computational units, each computational unit comprising a number of processing elements that work independently and transmit data simultaneously, wherein said computational units are arranged in clusters and work independently and transmit data simultaneously, and wherein said processing elements are globally and regularly inter-connected optically in a hypercube topology and transformed into a planar waveguide.

21. The ground based radar system of claim 20, wherein said processing unit is arranged to function as a digital beam forming unit, pulse compression unit, Doppler processing stage, envelope detection unit, Constant False Alarm Ratio unit (CFAR) and an extractor unit.

22. The ground based radar system of claim 21, wherein said digital beam forming unit, pulse compression unit, Doppler processing stage, envelope detection unit are arranged as two seven-dimensional hypercubes.

23. The ground based radar system of claim 21, wherein said Constant False Alarm Ratio unit and an extractor unit are arranged as a number of five-dimensional hypercubes.

24. A method of processing data in an airborne radar system comprising a data precessing unit for Space Time Adaptive Processing (STAP), said data processing unit comprising a number of computational units, each computational unit comprising a number of processing elements capable of working independently and transmitting data simultaneously, wherein said computational units are arranged in clusters, arranged to work independently and transmit data simultaneously, and wherein said processing elements are globally and regularly inter-connected through optical connection in a hypercube topology and transformed into a planar waveguide, the method comprising the steps of:
  a. Pre-processing, Doppler processing and performing two corner turns on the same six-dimensional hypercube,
  b. If the datacube is numbered odd, folding it and distributing data to an upper cluster of eight five-dimensional hypercubes,
  c. If the datacube is numbered even, folding it and distribute data to other cluster of five-dimensional hypercubes,
  d. Performing weights computation and application on the same working cluster of eight five-dimensional hypercubes and during a time period.

25. The method according to claim 24, wherein said distribution of step b is carried out at the same time interval as step a.

26. Method of processing data in a ground based radar system according to claim 24, the method comprising the steps of:
  a. Performing digital beam forming, pulse compression, Doppler processing, envelope detection, and two corner turns on said seven-dimensional hypercube during the first coherent pulse interval, b. Folding the datacube twice, from seven-dimensional to five-dimensional, c. Preparing to divide data among a pulse or range dimension depending on the shape of the datacube in the previous stage, and distribute fractions to an upper cluster of four five-dimensional hypercubes, if the datacube is numbered odd d. if the datacube is numbered even, distributing data to another cluster of five dimensional hypercubes, and e. Computing the CFAR and the extraction stage on the same cluster during the remaining time.

* * * * *

UNITED STATES PATENT AND TRADEMARK OFFICE
CERTIFICATE OF CORRECTION

PATENT NO. : 6,873,287 B2 Page 1 of 1
APPLICATION NO. : 09/985086
DATED : March 29, 2005
INVENTOR(S) : Hakan Forsberg It is certified that error appears in the above-identified patent and that said Letters Patent is hereby corrected as shown below:

In Column 6, Line 42, delete "alternative" and insert -- alterative --, therefor.

In Column 17, Line 36, in Claim 12, after "wherein" delete "said"

In Column 17, Line 37, in Claim 12, after "and" insert -- is --.

In Column 17, Line 43, in Claim 14, delete "according to" and insert -- in --, therefor.

In Column 17, Line 50, in Claim 15, delete "step" and insert -- steps --, therefor.

In Column 18, Line 34, in Claim 24, delete "precessing" and insert -- processing --, therefor.

Signed and Sealed this

Sixth Day of November, 2007

JON W. DUDAS
*Director of the United States Patent and Trademark Office*